W. Zimmerman,
Wood Chisel.
N°48,759. Patented July 11, 1865.
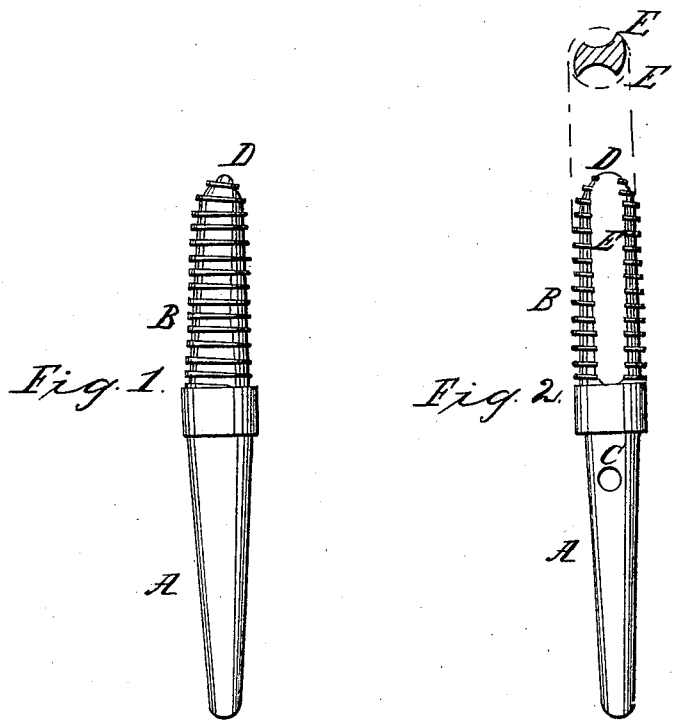
Witnesses:
John A. Sauberschmidt
J. W. Maedel
Inventor:
William Zimmerman
By his Attorney J. Dennis Jr

UNITED STATES PATENT OFFICE.

WM. ZIMMERMAN, OF QUINCY, ILLINOIS.

IMPROVEMENT IN REVOLVING MORTISING-TOOLS.

Specification forming part of Letters Patent No. 48,759, dated July 11, 1865.

*To all whom it may concern:*

Be it known that I, WILLIAM ZIMMERMAN, of Quincy, Adams county, and State of Illinois, have invented a new, useful, and Improved Revolving Tool for Making Mortises or Slots; and I do hereby declare that the following description and accompanying drawings are sufficient to enable any person skilled in the art or science to which it most nearly appertains to make and use my said invention or improvements without further invention or experiment.

The nature of my invention and improvement in rotating, mortising, and slotting tools consists in making teeth on one or more of the cutting-edges by grooving the surface, which improvement enables the tool to cut far easier and faster than if the cutting-edge was straight.

Figure 1 is a view of my improved tool for mortising and slotting, showing the corrugated or ribbed surface. Fig. 2 is a view showing one of the grooves which form the cutting-edges and receives the chips as they are cut.

In these drawings the same letters indicate like parts in each of the figures.

In the accompanying drawings, A is the shank of the rotating, mortising, and slotting tool, which may be fitted to the socket of a revolving arbor or shaft to turn it rapidly. B is the boring or cutting portion of the tool. To make this tool I take a piece of steel of a proper form and size to make the tool desired, and fit the shank A to the socket of a lathe-arbor and fasten it in securely by a pin through the hole C, or otherwise. After it is fastened in the socket I turn the projecting end to the size I wish to make the tool, and turn the end D a little angular or conical, as shown in the drawings, and then cut a screw-thread on it, and make one or more clearing-grooves, E, for the chips cut by the tool. Fig. 1 shows a tool with two grooves, and a view of the front end of the tool is made opposite the drawings. If I want one or more toothed edges and one or more edges without teeth, I do not cut a screw on the tool, but cut the longitudinal grooves to receive the chips and throw them into the mortise or slot cut, and then groove such parts of the tool as I want the teeth on roundwise with a file to form the teeth. The grooves made roundwise with a file may be made spiral or otherwise, as may be preferred.

My improved mortising and slotting tool may be made with one, two, or more cutting-edges by making one, two, or more grooves, according to the size of the tool and the kind of work to be done.

The clearing-grooves may be made spiral, if prefered that way, and the screw-thread may be made with a square or triangular groove, and with a single or two or more threads. I have found that screw-threads with a triangular score mark best in green wood that is tough and stringy. It is not so material about the shape of the teeth for dry hard wood.

One of the cutting-edges can be made straight, if preferred, and the tool can be made tapering to make a mortise wider at the surface than at the bottom.

In using this tool to mortise or slot it is only necessary to press the wood against it, so as to bore in the depth required, and then move the wood on the tool in the direction and distance the mortise is to be cut, and it is done in less time than it requires to remove the chips from a mortise cut with a chisel. The material may be moved against the tool or the material may be stationary and the tool moved in it.

I claim the new article of manufacture described, to wit:

A rotating, mortising, or slotting tool with teeth on the cutting-edges, substantially as described.

WM. ZIMMERMAN.

Witnesses:
NEWTON FLAGG,
P. C. KELLER.